US007184670B2

(12) United States Patent
Townsend

(10) Patent No.: US 7,184,670 B2
(45) Date of Patent: Feb. 27, 2007

(54) TELEMETRY SYSTEM AND METHOD FOR ACOUSTIC ARRAYS

(75) Inventor: VanWinkle (Van) T. Townsend, Herndon, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1026 days.

(21) Appl. No.: 09/847,751

(22) Filed: May 2, 2001

(65) Prior Publication Data

US 2001/0040718 A1 Nov. 15, 2001

Related U.S. Application Data

(60) Provisional application No. 60/203,275, filed on May 10, 2000.

(51) Int. Cl.
*H04B 10/00* (2006.01)
*H04J 4/00* (2006.01)

(52) U.S. Cl. ............... 398/169; 398/75; 398/104; 398/170

(58) Field of Classification Search ............. 398/52, 398/98–101, 104, 135, 138, 140, 141, 181, 398/182–183, 202, 237, 132–134, 75, 168–170; 359/285–287, 305, 310–312; 340/855.4, 340/855.6, 856.3, 856.4, 619; 356/478, 477; 385/12; 370/276, 280, 294, 297; 372/13; 455/39–40; 367/64, 117, 197; 379/111–141
See application file for complete search history.

(56) References Cited

U.S. PATENT DOCUMENTS 4,464,739 A 8/1984 Moorcroft 4,628,493 A * 12/1986 Nelson et al. ............ 367/79

(Continued)

OTHER PUBLICATIONS

W. Lin et al., "System Design and Optimization of Optically Amplified WDM-TDM Hybrid Polarization-Insensitive Fiber-Optic Michelson Interferometric Sensor", Journal of Lightwave Technologies, vol. 18, No. 3, Mar. 2000.*

(Continued)

*Primary Examiner*—Shi K. Li
(74) *Attorney, Agent, or Firm*—Dicke, Billig & Czaja, PLLC

(57) ABSTRACT

A telemetry system includes a plurality of acoustic sensors for receiving acoustic information and generating analog signals based on the received acoustic information. A first plurality of subsystems is coupled to at least a subset of the plurality of acoustic sensors. The first plurality of subsystems is configured to receive the analog signals from the acoustic sensors and generate digital values based on the received analog signals. The system includes a first optical splitter. A first optical transmitter transmits a first set of optical pulses to the first optical splitter. The first optical splitter is configured to transmit the first set of optical pulses to each subsystem in the first plurality of subsystems. Each subsystem in the first plurality of subsystems is configured to modulate the first set of optical pulses based on the generated digital values and thereby generate a modulated optical pulse stream. A first optical combiner receives and combines the modulated optical pulse stream from each subsystem in the first plurality of subsystems, thereby generating a combined modulated optical pulse stream. A first optical receiver receives the combined modulated optical pulse stream from the first optical combiner. The first optical receiver is configured to generate electrical signals based on the received combined modulated optical pulse stream.

25 Claims, 6 Drawing Sheets

U.S. PATENT DOCUMENTS

| | | | |
|---|---|---|---|
| 5,038,406 A * | 8/1991 | Titterton et al. | 398/125 |
| 5,047,990 A | 9/1991 | Gafos et al. | |
| 5,272,476 A * | 12/1993 | McArthur et al. | 340/870.13 |
| 5,361,157 A * | 11/1994 | Ishikawa et al. | 398/168 |
| 5,459,600 A * | 10/1995 | Davis et al. | 398/43 |
| 5,710,648 A * | 1/1998 | Frigo | 398/108 |
| 5,784,188 A * | 7/1998 | Nakamura et al. | 359/248 |
| 5,796,504 A | 8/1998 | Sonderegger et al. | |
| 5,815,295 A * | 9/1998 | Darcie et al. | 398/72 |
| 5,889,607 A * | 3/1999 | Suzuki et al. | 359/245 |
| 5,917,637 A * | 6/1999 | Ishikawa et al. | 398/197 |
| 6,043,917 A | 3/2000 | Sonderegger et al. | |
| 6,075,628 A * | 6/2000 | Fisher et al. | 398/21 |
| 6,079,882 A * | 6/2000 | Chien | 385/88 |
| 6,282,334 B1 * | 8/2001 | Hodgson et al. | 385/12 |
| 6,366,723 B1 * | 4/2002 | Medved et al. | 385/39 |
| 6,490,727 B1 * | 12/2002 | Nazarathy et al. | 725/129 |
| 6,515,939 B1 * | 2/2003 | Green et al. | 367/149 |
| 6,690,886 B1 * | 2/2004 | Guy | 398/81 |

OTHER PUBLICATIONS

Stowe et al., "Demodulation of Interferometric Sensors Using a Fiber-Optical Passive Quadrature Demodulator", Journal of Lightwave Technology, vol. LT-1, No. 3, Sep. 1983.*

* cited by examiner

TELEMETRY SYSTEM AND METHOD FOR ACOUSTIC ARRAYS

CROSS REFERENCE TO RELATED APPLICATIONS

This Non-Provisional Utility Patent Application claims the benefit of the filing date of U.S. Provisional Application Ser. No. 60/203,275, filed May 10, 2000, entitled "TELEMETRY FOR LARGE ACOUSTIC ARRAYS".

THE FIELD OF THE INVENTION

This invention relates generally to telemetry systems. This invention relates more particularly to a telemetry system that uses time division multiplexing for large acoustic arrays.

BACKGROUND OF THE INVENTION

The word "telemetry" generally refers to communications systems that make measurements at remote or inaccessible points, and transmit these measurements to receiving equipment where they are monitored, recorded, and displayed. Telemetric systems typically include one or more measuring/transmitting instruments, a medium of transmission, a receiver, and recording and/or display equipment. The measuring/transmitting instrument is usually a transducer, which converts physical stimuli into electrical signals.

One type of existing telemetry system is an underwater acoustic telemetry system, which may be used to determine the position of a submersible vehicle relative to an acoustic network. Such a system typically includes an acoustic sensor array positioned outside of a submersible vehicle, such as a submarine, and a plurality of outboard electronic (OBE) "bottles". The OBE bottles are electronic subsystems packaged in pressure insensitive containers positioned outside of the submersible vehicle. Each OBE bottle typically receives and processes acoustic signals from multiple acoustic sensors in the acoustic sensor array. Each OBE bottle is typically linked to an inboard electronic subsystem via a duplex fiber optic link.

Current conventional duplex fiber optic telemetry links are inadequate for future large bandwidth acoustic arrays. Hull penetrations must be provided for a pair of fiber optic cables for each OBE bottle. Hull penetrations are expensive and generally undesirable. In addition, having complete optical transmission and receiving capabilities in each OBE bottle increases outboard power dissipation.

It is anticipated that larger arrays will be needed in future telemetric applications, including more OBE bottles with higher bandwidth. Expanding existing telemetry systems, such as the system summarized above, results in additional problems. Adding OBE bottles requires additional undesirable hull penetrations and results in even greater outboard power dissipation.

In addition, use of the existing Transparent Asynchronous Transmitter-Receiver Interface (TAXI) protocol for conventional telemetry systems appears to be near an end. TAXI is an older protocol that does not work well for large sensor arrays. It appears unlikely that vendors will continue to produce TAXI chipsets.

It would be desirable to provide a high bandwidth telemetry system at a low cost, with less complexity, fewer hull penetrations, less power consumption, and better reliability than existing systems, and that is extendible to large acoustic arrays.

SUMMARY OF THE INVENTION

One form of the present invention provides a telemetry system, including a plurality of acoustic sensors for receiving acoustic information and generating analog signals based on the received acoustic information. A first plurality of subsystems is coupled to at least a subset of the plurality of acoustic sensors. The first plurality of subsystems is configured to receive the analog signals from the acoustic sensors and generate digital values based on the received analog signals. The system includes a first optical splitter. A first optical transmitter transmits a first set of optical pulses to the first optical splitter. The first optical splitter is configured to transmit the first set of optical pulses to each subsystem in the first plurality of subsystems. Each subsystem in the first plurality of subsystems is configured to modulate the first set of optical pulses based on the generated digital values and thereby generate a modulated optical pulse stream. A first optical combiner receives and combines the modulated optical pulse stream from each subsystem in the first plurality of subsystems, thereby generating a combined modulated optical pulse stream. A first optical receiver receives the combined modulated optical pulse stream from the first optical combiner. The first optical receiver is configured to generate electrical signals based on the received combined modulated optical pulse stream.

Another form of the present invention provides a system for remotely retrieving data from an array of sensors. The system includes an optical source for generating a stream of optical pulses. An optical splitter splits the stream of optical pulses into a plurality of streams of optical pulses. The system includes a plurality of optical modulators. Each optical modulator is configured to receive one of the plurality of streams of optical pulses. Each optical modulator is configured to receive sensor information from at least one of the sensors. Each optical modulator is configured to modulate the received stream of optical pulses based on the received sensor information and thereby generate a modulated stream of optical pulses. An optical combiner receives a modulated stream of optical pulses from each of the optical modulators and combines the modulated streams of optical pulses into a combined modulated stream of optical pulses. An optical receiver receives the combined modulated stream of optical pulses.

Another form of the present invention provides a method for remotely retrieving data from an array of sensors. A plurality of streams of optical pulses are remotely generated. The plurality of streams of optical pulses are received with a plurality of optical modulators. Each of the received streams of optical pulses is modulated with the plurality of optical modulators based on sensor information generated by the array of sensors, thereby generating a plurality of modulated streams of optical pulses. The plurality of modulated streams of optical pulses are combined into a combined modulated stream of optical pulses. The combined modulated stream of optical pulses is transmitted. The transmitted combined modulated stream of optical pulses is remotely received.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
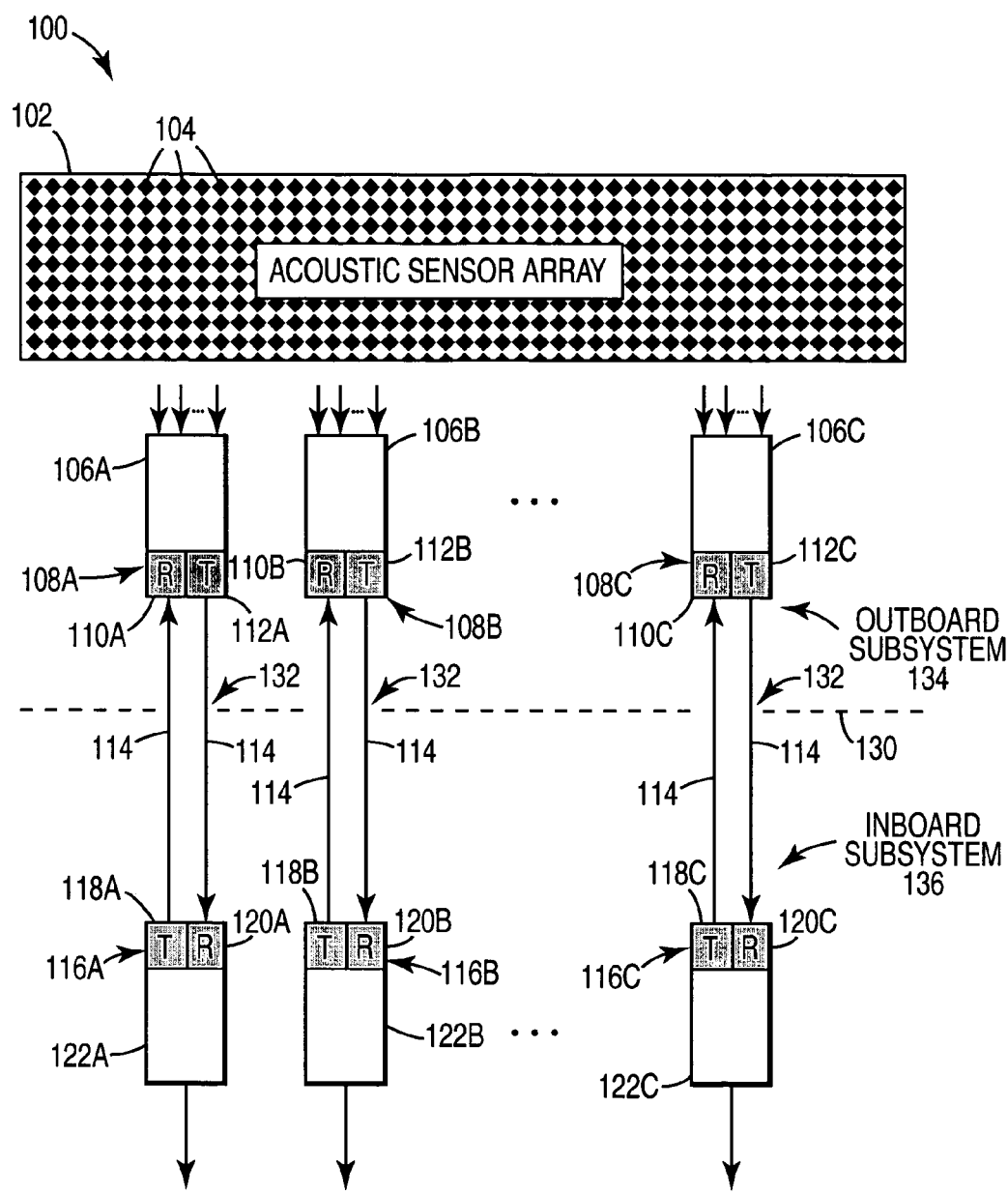
FIG. 1 is a block diagram illustrating major components of a prior art telemetry system.

FIG. 1 is a block diagram illustrating major components of a prior art telemetry system. Telemetry system 100 is an underwater acoustic telemetry system that may be used in a submersible vehicle, such as a submarine, and which may be used to determine the position of a submersible vehicle relative to an acoustic network.

Telemetry system 100 includes acoustic sensor array 102, outboard electronic (OBE) bottles 106A–106C (collectively referred to as OBE bottles 106), and inboard electronic subsystems 122A–122C (collectively referred to as inboard electronic subsystems 122). Acoustic sensor array 102 includes a plurality of acoustic sensors 104. Each OBE bottle 106 is coupled to a subset of the acoustic sensors 104. OBE bottles 106 include optical interfaces 108A–108C (collectively referred to as optical interfaces 108). Optical interfaces 108 include optical receivers 110A–110C (collectively referred to as optical receivers 110), and optical transmitters 112A–112C (collectively referred to as optical transmitters 112).

Inboard electronic subsystems 122 include optical interfaces 116A–116C (collectively referred to as optical interfaces 116). Optical interfaces 116 include optical transmitters 118A–118C (collectively referred to as optical transmitters 118), and optical receivers 120A–120C (collectively referred to as optical receivers 120). To simplify the explanation and illustration of telemetry system 100, only three OBE bottles 106 and three inboard electronic subsystems 122 are shown in FIG. 1. Actual implementations of telemetry system 100 will include several more OBE bottles 106 and subsystems 122.

Telemetry system 100 is divided into outboard subsystem 134 and inboard subsystem 136. The division between outboard subsystem 134 and inboard subsystem 136 is represented by dashed line 130. Dashed line 130 represents the hull of a submersible vehicle in one embodiment. As shown in FIG. 1, acoustic sensor array 102 and OBE bottles 106 are positioned outboard, and subsystems 122 are positioned inboard.

Each optical interface 108 of an OBE bottle 106 is coupled to an optical interface 116 of one of the inboard electronic subsystems 122 via a pair of fiber-optic cables 114. Hull penetrations 132 must be provided to accommodate a pair of fiber-optic cables 114 for each OBE bottle 106. In addition, having complete optical transmission and receiving capabilities in each OBE bottle 106 increases cost, complexity, and outboard power dissipation. Further, having separate inboard optical transmission and receiving capabilities associated with each OBE bottle 106 increases inboard costs and complexity. Extension to higher bandwidth implementations perpetuates these cost and complexity disadvantages.

OBE bottles 106 are electronic subsystems packaged in pressure insensitive containers positioned outside of the submersible vehicle. Each OBE bottle 106 receives and processes analog acoustic signals from multiple acoustic sensors 104 in acoustic sensor array 102. Each OBE bottle 106 includes a plurality of components, such as signal shaping circuitry, analog amplification circuitry, analog-to-digital (A/D) conversion circuitry, and multiplexing circuitry. Each OBE bottle 106 generates digital values representative of received acoustic information from the acoustic sensors 104 coupled to the bottle 106. Each OBE bottle 106 converts the digital values to optical pulses, which are transmitted by optical transmitter 112 over a fiber optical cable 114 to an inboard optical receiver 120. Each inboard subsystem 122 typically transmits gain parameters and timing information via optical transmitters 118 to optical receivers 110 in OBE bottles 106.

Figure 2:
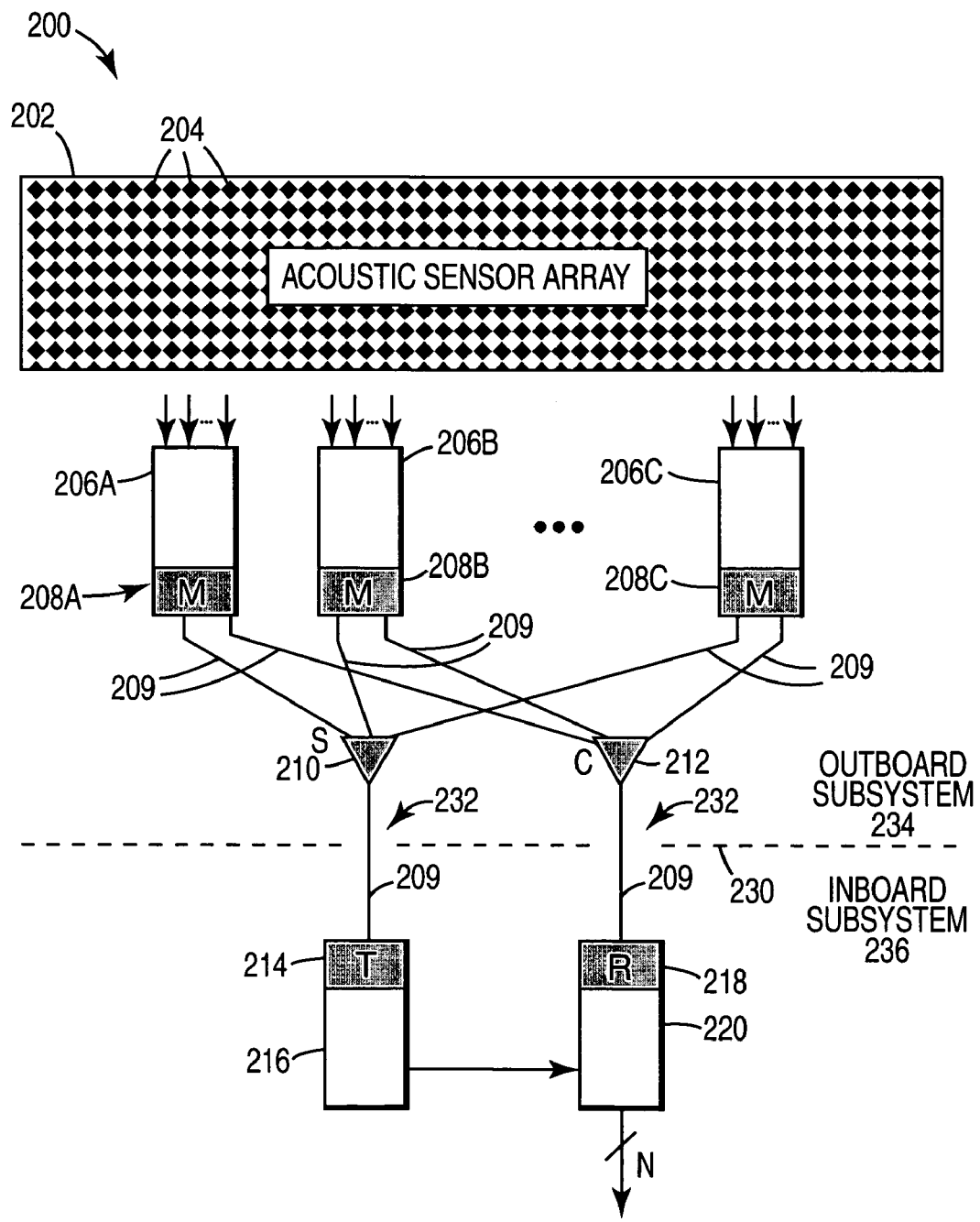
FIG. 2 is a block diagram illustrating major components of a telemetry system according to one embodiment of the present invention, which uses time division multiplexing.

FIG. 2 is a block diagram illustrating major components of a telemetry system according to one embodiment of the present invention, which uses time division multiplexing. In one embodiment, telemetry system 200 is an underwater acoustic telemetry system that may be used in a submersible vehicle, such as a submarine. Although embodiments of the present invention are described in the context of an underwater acoustic telemetry system, techniques of the present invention are applicable to any type of telemetry system, including telemetry systems that are not submersible.

Telemetry system 200 includes acoustic sensor array 202, outboard electronic (OBE) bottles 206A–206C (collectively referred to as OBE bottles 206), optical splitter 210, optical combiner 212, and inboard electronic subsystems 216 and 220. Acoustic sensor array 202 includes a plurality of acoustic sensors 204. Each OBE bottle 206 is coupled to a subset of the acoustic sensors 204. OBE bottles 206 include optical modulators 208A–208C (collectively referred to as optical modulators 208). Inboard electronic subsystem 216 includes optical transmitter 214. Inboard electronic subsystem 220 includes optical receiver 218. To simplify the explanation and illustration of telemetry system 200, only three OBE bottles 206 are shown in FIG. 2. Actual implementations of telemetry system 200 will include several more OBE bottles 206.

Telemetry system 200 is divided into outboard subsystem 234 and inboard subsystem 236. The division between outboard subsystem 234 and inboard subsystem 236 is represented by dashed line 230. In one embodiment, dashed line 230 represents the hull of a submersible vehicle. As shown in FIG. 2, acoustic sensor array 202, OBE bottles 206, optical splitter 210, and optical combiner 212, are positioned outboard, and subsystems 216 and 220 are positioned inboard.

Each optical modulator 208 of an OBE bottle 206 is coupled to optical splitter 210 via a fiber-optic cable 209. Each optical modulator 208 of an OBE bottle 206 is also coupled to optical combiner 212 via a fiber-optic cable 209. Optical splitter 210 is coupled to optical transmitter 214 via a fiber-optic cable 209. Optical combiner 212 is coupled to optical receiver 218 via a fiber-optic cable 209. Two hull penetrations 232 are provided to accommodate the two fiber-optic cables 209 coupling optical splitter 210 and optical transmitter 214, and coupling optical combiner 212 and optical receiver 218. In one embodiment of a telemetry system according to the present invention, any of the fiber optic cables may be replaced by free space or "open-air" beams.

Like OBE bottles 106 shown in FIG. 1, OBE bottles 206 are also electronic subsystems packaged in pressure insensitive containers positioned outside of the submersible vehicle. Each OBE bottle 206 receives and processes analog acoustic signals from multiple acoustic sensors 204 in acoustic sensor array 202. In one embodiment, each OBE bottle 206 is coupled to about 5 to 100 acoustic sensors 204, although other numbers of sensors 204 may be coupled to each OBE bottle 206.

Each OBE bottle 206 includes a plurality of components, such as signal shaping circuitry, analog amplification circuitry, analog-to-digital (A/D) conversion circuitry, and multiplexing circuitry. Each OBE bottle 206 generates digital values representative of received acoustic information from the acoustic sensors 204 coupled to the bottle 206. Each modulator 208 within an OBE bottle 206 modulates a received optical pulse stream based on the generated digital values as discussed in further detail below. In one embodiment, optical modulators 208 are one of a semiconductor modulator, a $LiNbO_3$ Mach-Zender directional coupler modulator, or a low voltage polymeric modulator.

In contrast to prior art telemetry system 100 shown in FIG. 1, OBE bottles 206 in telemetry system 200 do not generate optical pulses. Each OBE bottle 206 does not have complete optical transmission and receiving components as in telemetry system 100. Rather, in one embodiment, modulators 208 in OBE bottles 206 pass or block received optical pulses, which requires less power and is more reliable than generating optical pulses outboard at each OBE bottle 206. In addition, the plurality of inboard optical transmitters 118 in prior art telemetry system 100 are replaced by a single inboard optical transmitter 214 and an outboard optical splitter 210. And the plurality of inboard optical receivers 120 in prior art telemetry system 100 are replaced by a single inboard optical receiver 218, thereby reducing cost and complexity.

Optical transmitter 214 generates and transmits a stream of optical pulses to optical splitter 210. In one embodiment, the stream of optical pulses transmitted by optical transmitter 214 has a duty cycle of about 10%. In one form of the present invention, the duty cycle of the stream of optical pulses transmitted by optical transmitter 214 is determined by the function "1/(2N)", where N represents the number of OBE bottles 206 receiving optical pulses from the transmitter 214. The optical pulses transmitted by optical transmitter 214 preferably have relatively large energy and are at a relatively high repetition rate. In one embodiment, the output power of optical transmitter 214 is determined based on the number of OBE bottles 206 served by the optical transmitter 214.

Optical splitter 210 splits the received stream of optical pulses from optical transmitter 214 into a plurality of optical pulse streams, and outputs one of the optical pulse streams to each optical modulator 208. The number of optical pulse streams provided by optical splitter 210 depends upon the number of OBE bottles 206 in a particular implementation. In one form of the invention, optical splitter 210 is a passive optical splitter.

Each optical modulator 208 modulates the optical pulse stream received from optical splitter 210 based on acoustic information received from acoustic sensors 204, and thereby generates a modulated optical pulse stream. In one embodiment, each optical modulator 208 modulates a received stream of optical pulses by either blocking or passing optical pulses. Each optical modulator 208 transmits the modulated optical pulse stream to optical combiner 212, which combines the various modulated optical pulse streams into a combined modulated optical pulse stream.

In one embodiment, optical combiner 212 is a passive optical combiner. In one form of the invention, optical combiner 212 is essentially the same as optical splitter 210, but light goes through optical combiner 212 in the opposite direction as optical splitter 210. Optical combiner 212 outputs the combined modulated optical pulse stream to optical receiver 218. Optical receiver 218 converts the combined modulated optical pulse stream to electronic information for use by electronic subsystem 220. In one embodiment, optical receiver 218 is synchronized with optical transmitter 214 for simplified clock recovery and deserialization.

Figure 3:
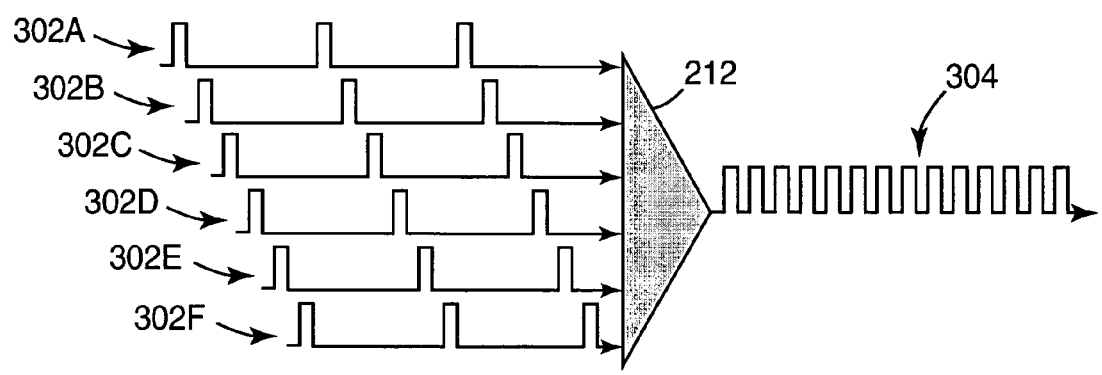
FIG. 3 is a diagram illustrating optical splitting and optical combining operations performed according to one embodiment of the present invention.

FIG. 3 is a diagram illustrating optical splitting and optical combining operations performed according to one embodiment of the present invention. Waveforms 302A–302F (collectively referred to as waveforms 302) represent optical pulse streams received by modulators 208 from optical splitter 210. Waveforms 302 are essentially the same, but are staggered in time. In one embodiment, the staggered waveforms 302 are provided by using a different length of fiber optic cable 209 between optical splitter 210 and each optical modulator 208, so that the optical pulse stream arrives at each modulator 208 at a different point in time. The differential cable lengths are used to help ensure that optical pulses do not overlap when later combined, which would result in a loss of information. Thus, waveform 302A represents an optical pulse stream received by the optical modulator 208 with the shortest fiber optic cable 209, waveform 302B represents an optical pulse stream received by the optical modulator with the next shortest fiber optic cable 209, and so on. Alternatively, or additionally, the length of the fiber optic cables 209 coupling optical modulators 208 and optical combiner 212 can be varied to provide appropriately staggered optical pulses.

Waveforms 302 also represent optical pulse streams transmitted by optical modulators 208 to optical combiner 212. To simplify the illustration, waveforms 302 are not modulated. Combiner 212 combines the optical pulse streams 302 into a single combined pulse stream 304 in a time division multiplexed format. With modulation added, stream 304 represents a combined modulated pulse stream. Enough time should be provided between optical pulses transmitted by optical transmitter 214 to allow the return optical pulses from each OBE bottle 206 to be combined without overlapping. The time between optical pulses transmitted by optical transmitter 214 will depend upon the number of OBE bottles 206 in the particular implementation.

Figure 4:
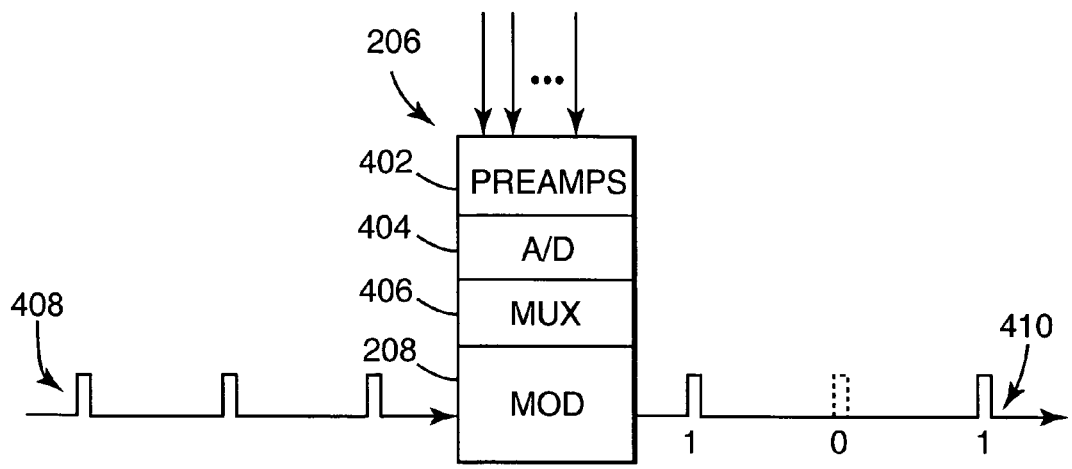
FIG. 4 is a block diagram illustrating major components of an OBE bottle according to one embodiment of the present invention.

FIG. 4 is a block diagram illustrating major components of an OBE bottle 206 according to one embodiment of the present invention. OBE bottle 206 includes pre-amplifiers 402, analog-to-digital (A/D) converters 404, multiplexer 406, and optical modulator 208. Pre-amplifiers 402 receive analog signals from a subset of the acoustic sensors 204, amplify the received signals, and output the amplified signals to A/D converters 404. A/D converters 404 convert the received analog signals to digital values. In one embodiment, A/D converters 404 convert the received signals to 16 bit digital values. Multiplexer 406 is coupled to A/D converters 404, and outputs digital values from each A/D converter 404 in turn to modulator 208. In one embodiment, multiplexer 406 outputs a 16 bit sample from a first acoustic sensor 204, followed by a 16 bit sample from a second acoustic sensor 204, followed by 16 bit samples, in turn, from the other acoustic sensors 204 coupled to the OBE bottle 206.

Optical modulator 208 receives optical pulse stream 408 from optical splitter 210. Optical modulator 208 modulates optical pulse stream 408 based on the digital values provided by multiplexer 406. In one embodiment, optical modulator 208 either passes or blocks an optical pulse in optical pulse stream 408 based on whether a current bit provided by multiplexer 406 is a "1" or a "0". In one form of the invention, optical modulator 208 blocks an optical pulse to represent a "0" bit, and passes an optical pulse to represent a "1" bit, as represented by modulated optical pulse stream 410. The second optical pulse in modulated optical pulse stream 410 is shown with dashed lines, indicating that optical modulator 208 blocked this pulse. In an alternative embodiment, optical modulator 208 blocks an optical pulse to represent a "1" bit, and passes an optical pulse to represent a "0" bit.

Figure 5:
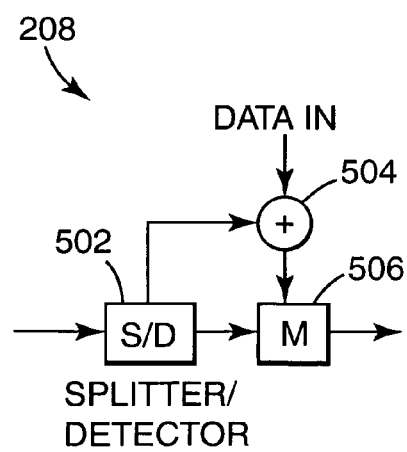
FIG. 5 is a block diagram of major components of an optical modulator according to one embodiment of the present invention.

FIG. 5 is a block diagram of major components of an optical modulator 208 according to one embodiment of the present invention. Optical modulator 208 includes optical splitter/detector 502, summation block 504, and modulator driver 506. Splitter/detector 502 detects when an input optical pulse is received from optical splitter 210, and splits the optical pulse into two pulses. One pulse from splitter/detector 502 is output to modulator driver 506, and the second pulse is output to summation block 504. The received optical pulse at summation block 504 causes summation block 504 to gate the current bit value provided from multiplexer 406 (i.e., "Data in") into modulator driver 506. In one embodiment, if the current bit value is a "1", modulator driver 506 gradually turns on so that it will be in a passing mode to pass the next received optical pulse when it arrives, and if the current bit value is a "0", modulator driver 506 gradually turns off so that it will be in a blocking mode to block the next received optical pulse when it arrives.

Figure 6:
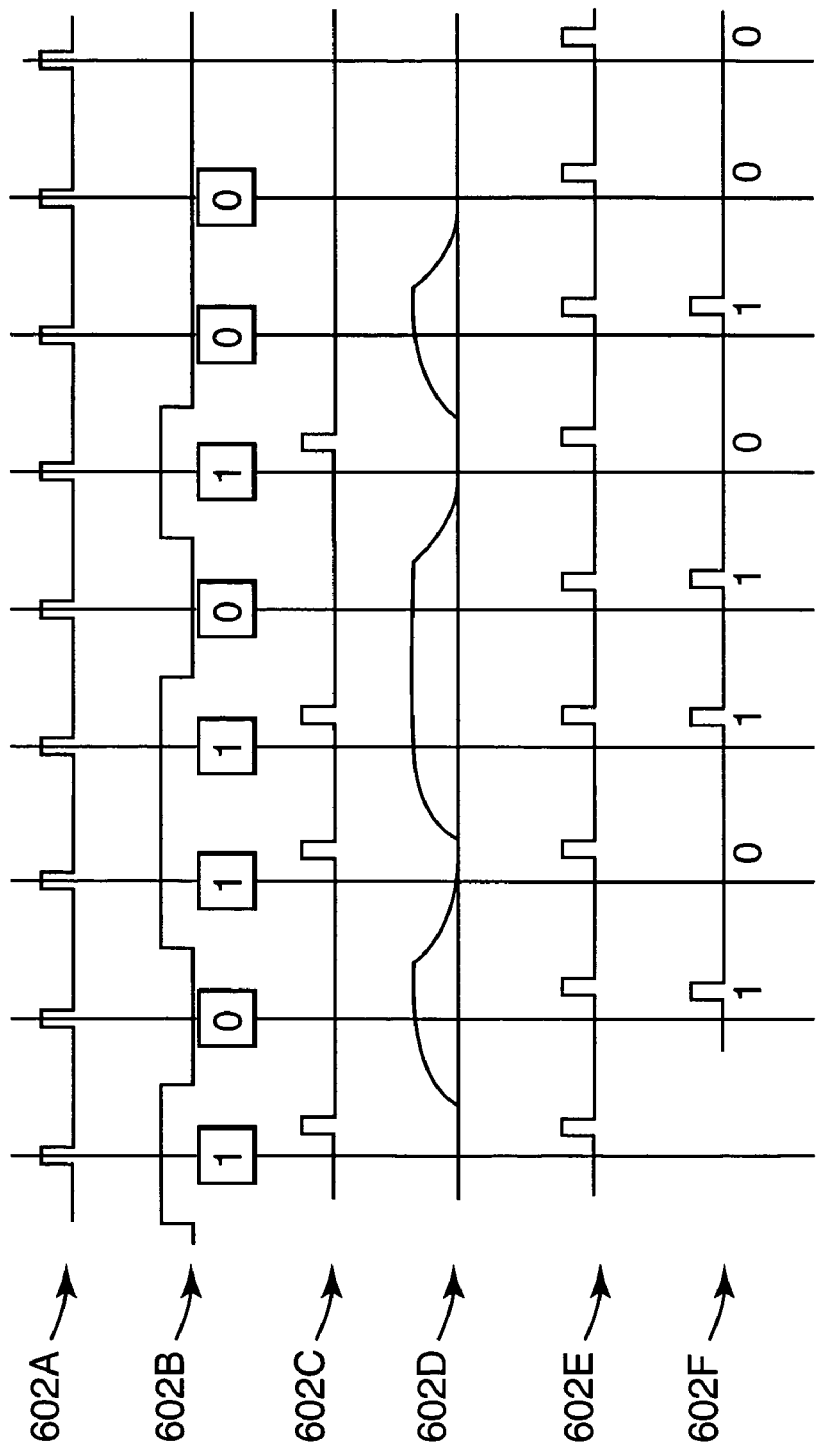
FIG. 6 illustrates optical and electrical waveforms generated in one embodiment of the present invention.

FIG. 6 illustrates optical and electrical waveforms 602A–602F generated in one embodiment of the present invention. Waveform 602A represents an optical pulse stream output from optical splitter 210 to one of optical modulators 208. Waveform 602B represents an electrical bit stream of element data derived from acoustic sensors 204 and output by multiplexer 406 to summation block 504. As shown in FIG. 6, a high signal in waveform 602B represents a "1" value, and a low signal represents a "0" value.

Waveform 602C represents electrical signals output from summation block 504 to modulator driver 506. As shown in waveform 602C, when summation block 504 receives a "1" value from multiplexer 406 (waveform 602B), summation block 504 outputs an electrical pulse to modulator driver 506.

Waveform 602D represents a transfer function of modulator driver 506. When modulator driver 506 receives an electrical pulse from summation block 504 (waveform 602C), modulator driver 506 gradually turns on (as represented by the gradually increasing transfer function) so that modulator driver 506 will be in a pass mode to pass the next input optical pulse. If modulator driver 506 receives successive electrical pulses from summation block 504, modulator driver 506 remains in a pass mode to pass successive input optical pulses. If modulator driver 506 does not receive an electrical pulse from summation block 504 during any of the pulse periods represented by the vertical lines in FIG. 6, modulator driver 506 gradually turns off (as represented by the gradually decreasing transfer function), so that modulator driver 506 will be in a blocking mode to block the next input optical pulse.

Waveform 602E represents an optical pulse stream that is input to modulator driver 506. The optical pulse stream represented by waveform 602E is the same as the optical pulse stream represented by waveform 602A, but is slightly delayed. Waveform 602F represents a modulated optical pulse stream output by modulator driver 506 to optical combiner 212. As can be seen by comparing waveforms 602D, 602E, and 602F, when modulator driver 506 is on and in passing mode (represented by a high signal in waveform 602D), modulator driver 506 passes received optical pulses. A passed optical pulse represents a "1" bit value as shown in waveform 602F. When modulator driver 506 is off and in blocking mode (represented by a low signal in waveform 602D), modulator driver 506 blocks received optical pulses. A blocked optical pulse represents a "0" bit value as shown in waveform 602F.

The techniques described herein allow relatively inexpensive optical modulators to be used, since fast turn-on times are not needed. Optical modulators 208 may be turned on or turned off relatively slowly so that they are in the proper mode to block or pass an optical pulse by the time the optical pulse arrives. Therefore, in one embodiment, the high frequency short pulse information is generated inboard by optical transmitter 216, and relatively slow and inexpensive electronics are used outboard to switch the received light pulses on or off to encode data.

With a large acoustic array 202, multiple optical transmitters 216 and optical receivers 220 may be used to provide increased bandwidth. When multiple optical transmitters 216 are used, it is desirable to operate each optical transmitter at a different frequency to help to avoid a power loss that typically occurs during optical splitting and combining operations. For example, when an optical pulse is split by a passive optical splitter into 10 pulses, each of the 10 pulses will have one tenth of the power of the original pulse. Similarly, when 10 optical pulses are combined by a passive optical combiner, there is again a 10 to 1 power loss. The power loss problem can be addressed by originally transmitting a high intensity pulse. The power loss problem can also be reduced or eliminated by using wavelength division multiplexing, wherein each optical transmitter transmits optical pulses at a different wavelength. When optical pulse streams at different wavelengths are combined by a wavelength sensitive combiner, a much greater optical efficiency can be obtained.

Figure 7:
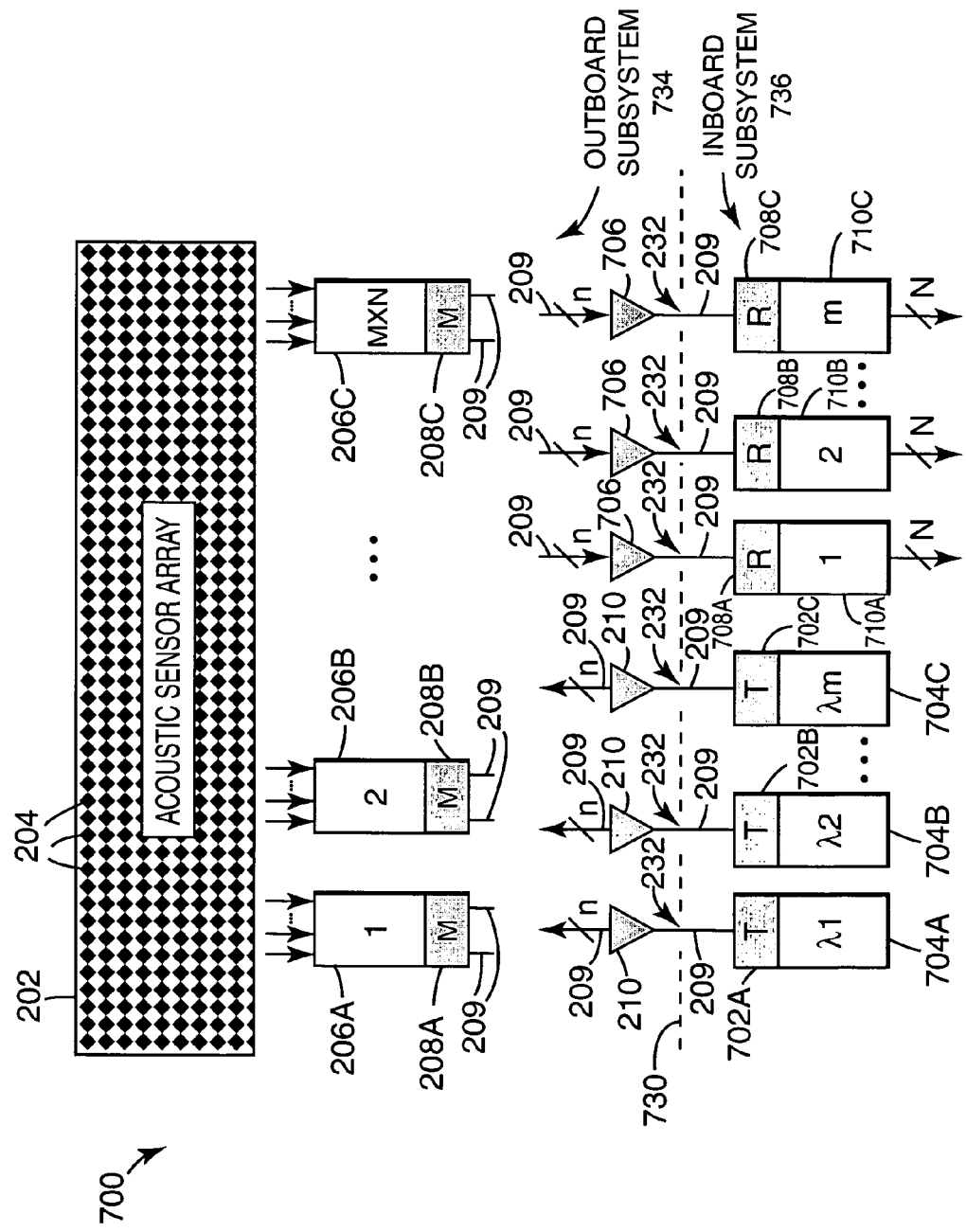
FIG. 7 is a block diagram of an alternative embodiment of a telemetry system according to the present invention, which combines time division multiplexing and wavelength division multiplexing.

FIG. 7 is a block diagram of an alternative embodiment of a telemetry system according to the present invention, which combines time division multiplexing and wavelength division multiplexing. Telemetry system 700 includes acoustic sensor array 202, outboard electronic (OBE) bottles 206A–206C (collectively referred to as OBE bottles 206), optical splitters 210, optical combiners 706, inboard electronic subsystems 704A–704C (collectively referred to as inboard electronic subsystems 704), and inboard electronic subsystems 710A–710C (collectively referred to as inboard electronic subsystems 710).

Acoustic sensor array 202 includes a plurality of acoustic sensors 204. Each OBE bottle 206 is coupled to a subset of the acoustic sensors 204. OBE bottles 206 include optical modulators 208A–208C (collectively referred to as optical modulators 208). Inboard electronic subsystems 704A–704C include optical transmitters 702A–702C (collectively referred to as optical transmitters 702), respectively. Inboard electronic subsystems 710A–710C include optical receivers 708A–708C (collectively referred to as optical receivers 708), respectively.

Telemetry system 700 is divided into outboard subsystem 734 and inboard subsystem 736. The division between outboard subsystem 734 and inboard subsystem 736 is represented by dashed line 730. In one embodiment, dashed line 730 represents the hull of a submersible vehicle. As shown in FIG. 7, acoustic sensor array 202, OBE bottles 206, optical splitters 210, and optical combiners 706, are positioned outboard, and subsystems 704 and 710 are positioned inboard.

Each optical modulator 208 of an OBE bottle 206 is coupled to one of the optical splitters 210 via a fiber-optic cable 209. Each optical modulator 208 of an OBE bottle 206 is also coupled to one of the optical combiners 706 via a fiber-optic cable 209. Each optical splitter 210 is coupled to one of the optical transmitters 702 via a fiber-optic cable 209. Each optical combiner 706 is coupled to one of the optical receivers 708 via a fiber-optic cable 209. Hull penetrations 232 are provided to accommodate the fiber-optic cables 209 coupling optical splitters 210 and optical transmitters 702, and coupling optical combiners 706 and optical receivers 708.

As shown in FIG. 7, telemetry system 700 includes "m" subsystems 704, and "m" subsystems 710, where "m" is an integer variable. Each optical transmitter 702 transmits a stream of optical pulses with a different wavelength than the streams of optical pulses transmitted by the other optical transmitters 702. The different wavelengths for each subsystem 704 are represented in FIG. 7 by "λ1," "λ2," up to "λm." The stream of optical pulses from each optical transmitter 702 is provided to one of the optical splitters 210. Each optical splitter 210 is coupled to "n" optical modulators 208 via "n" fiber optic cables, where "n" is an integer variable. Therefore, with "m" optical transmitters 702, and with each optical transmitter 702 coupled to "n" optical modulators 208, the number of optical modulators 208 (and correspondingly the number of OBE bottles 206) will be "m" multiplied by "n".

Each optical combiner 706 is coupled to "n" optical modulators 208 via "n" fiber optic cables 209. In one embodiment, the "n" modulators 208 coupled to a single combiner 706 are also coupled to different ones of the optical transmitters 702, as opposed to being coupled to a single optical transmitter 702. Therefore, the "n" optical pulse streams received by each optical combiner 706 have different wavelengths. In one embodiment, optical combiners 706 are wavelength sensitive combiners. When optical pulse streams at different wavelengths are combined by a wavelength sensitive combiner, such as optical combiners 706, a much greater optical efficiency can be obtained. With the exception of the addition of wavelength division multiplexing, telemetry system 700 operates substantially the same as telemetry system 200 described above.

Deserialization of the recombined, time-delayed outputs from the plurality of OBE bottles 206/modulators 208 produces the exact equivalent output of the same number of current SOA links. For example, if 10 conventional 100 Mbps links are replaced by a single 1 Gbps TDM telemetry system using the same 10 OBE bottles and combining 10 differentially delayed pulse replicas, then a 10:1 deserializer following the 1 Gbps inboard receiver will replicate the original (10) 100 Mbps data streams. This would allow the new telemetry scheme to be easily integrated with an existing legacy signal processing subsystem. A deserialization function is often included in a complete optical receiver to convert the high-speed serial receiver input into parallel output data words. In this case, each bit of the deserialized output word is, in fact, itself a serial representation of each OBE bottle output.

One embodiment of the present invention provides a high bandwidth telemetry system at a low cost, with less complexity, fewer hull penetrations, less power consumption, better reliability, and greater bandwidth than existing systems. Embodiments of the present invention retain all of the signal preprocessing functionality and implementation of conventional outboard electronics. All components of embodiments of the present invention are available commercially off the shelf. Embodiments of the present invention provide unlimited bandwidth growth for future sensor arrays. In addition, by using outboard modulators, most of the active optical components are easily accessible within the hull working space for maintenance or replacement. This can greatly increase system availability (up-time).

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A telemetry system comprising:
a plurality of acoustic sensors for receiving acoustic information and generating analog signals based on the received acoustic information;
a first plurality of subsystems coupled to at least a subset of the plurality of acoustic sensors, the first plurality of subsystems configured to receive the analog signals from the acoustic sensors and generate digital values based on the received analog signals;
a first optical splitter;
a first optical transmitter for transmitting a first set of optical pulses to the first optical splitter, the first optical splitter configured to transmit the first set of optical pulses to each subsystem in the first plurality of subsystems, each subsystem in the first plurality of subsystems configured to modulate the first set of optical pulses based on the generated digital values and thereby generate a modulated optical pulse stream;
a first optical combiner for receiving and combining the modulated optical pulse stream from each subsystem in the first plurality of subsystems, thereby generating a combined modulated optical pulse stream; and
a first optical receiver for receiving the combined modulated optical pulse stream from the first optical combiner, the first optical receiver configured to generate electrical signals based on the received combined modulated optical pulse stream.

2. The telemetry system of claim 1, wherein the telemetry system is an underwater acoustic telemetry system for use in a submersible vehicle.

3. The telemetry system of claim 2, wherein the plurality of acoustic sensors, the first plurality of subsystems, the first optical splitter, and the first optical combiner are configured to be positioned outboard of the submersible vehicle, and the first optical transmitter and the first optical receiver are configured to be positioned inboard of the submersible vehicle.

4. The telemetry system of claim 1, wherein the first optical splitter is a passive optical splitter, and wherein the first optical combiner is a passive optical combiner.

5. The telemetry system of claim 1, wherein a duty cycle of the first set of optical pulses is about $1/(2N)$, where N represents the number of subsystems in the first plurality of subsystems.

6. The telemetry system of claim 1, wherein the combined modulated optical pulse stream is in a time division multiplexed format.

7. The telemetry system of claim 1, wherein the combined modulated optical pulse stream is in a time division multiplexed format and a wavelength division multiplexed format.

8. The telemetry system of claim 1, wherein each subsystem in the first plurality of subsystems includes an optical modulator for modulating the first set of optical pulses based on the generated digital values.

9. The telemetry system of claim 8, wherein each optical modulator modulates the first set of optical pulses by passing and blocking optical pulses in the first set of optical pulses.

10. The telemetry system of claim 1, and further comprising:
a second plurality of subsystems coupled to at least a subset of the plurality of acoustic sensors, the second plurality of subsystems configured to receive the analog signals from the acoustic sensors and generate digital values based on the received analog signals;
a second optical splitter;
a second optical transmitter for transmitting a second set of optical pulses to the second optical splitter, the second optical splitter configured to transmit the second set of optical pulses to each subsystem in the second plurality of subsystems, each subsystem in the second plurality of subsystems configured to modulate the second set of optical pulses based on the generated digital values and thereby generate a modulated optical pulse stream;
a second optical combiner for receiving and combining the modulated optical pulse stream from each subsystem in the second plurality of subsystems, thereby generating a combined modulated optical pulse stream; and
a second optical receiver for receiving the combined modulated optical pulse stream from the second optical combiner, the second optical receiver configured to generate electrical signals based on the received combined modulated optical pulse stream.

11. The telemetry system of claim 1, and further comprising:
a second plurality of subsystems coupled to at least a subset of the plurality of acoustic sensors, the second plurality of subsystems configured to receive the analog signals from the acoustic sensors and generate digital values based on the received analog signals;
a second optical splitter;
a second optical transmitter for transmitting a second set of optical pulses to the second optical splitter, the second set of optical pulses having a different wavelength than the first set of optical pulses, the second optical splitter configured to transmit the second set of optical pulses to each subsystem in the second plurality of subsystems, each subsystem in the second plurality of subsystems configured to modulate the second set of optical pulses based on the generated digital values and thereby generate a modulated optical pulse stream; and
the first optical combiner configured to receive and combine the modulated optical pulse stream from each subsystem in the first plurality of subsystems and the second plurality of subsystems, thereby generating a combined modulated optical pulse stream, the combined modulated optical pulse stream being in a time division multiplexed format and a wavelength division multiplexed format.

12. A system for remotely retrieving data from an array of sensors, the system comprising:
an optical source for generating a stream of optical pulses;
an optical splitter for splitting the stream of optical pulses into a plurality of streams of optical pulses;
a plurality of optical modulators, each optical modulator configured to receive one of the plurality of streams of optical pulses, each optical modulator configured to receive sensor information from at least one of the sensors, each optical modulator configured to modulate the received stream of optical pulses based on the received sensor information and thereby generate a modulated stream of optical pulses;
an optical combiner for receiving a modulated stream of optical pulses from each of the optical modulators and combining the modulated streams of optical pulses into a combined modulated stream of optical pulses; and
an optical receiver for receiving the combined modulated stream of optical pulses.

13. The system of claim 12, wherein the array of sensors is an array of acoustic sensors.

14. The system of claim 12, wherein the system is an underwater acoustic telemetry system for use in a submersible vehicle.

15. The system of claim 12, wherein the optical splitter is a passive optical splitter, and wherein the optical combiner is a passive optical combiner.

16. The system of claim 12, wherein a duty cycle of the stream of optical pulses is about $1/(2N)$, where N represents the number of optical modulators.

17. The system of claim 12, wherein the combined modulated stream of optical pulses is in a time division multiplexed format.

18. The system of claim 12, wherein the combined modulated stream of optical pulses is in a time division multiplexed format and a wavelength division multiplexed format.

19. The system of claim 12, wherein each optical modulator modulates the received stream of optical pulses by passing and blocking optical pulses in the received stream.

20. A method for remotely retrieving data from an array of sensors, the method comprising:
remotely generating a stream of optical pulses;
splitting the stream of optical pulses into a plurality of streams of optical pulses receiving the plurality of streams of optical pulses with a plurality of optical modulators;
modulating each of the received streams of optical pulses with the plurality of optical modulators based on sensor information generated by the array of sensors, and thereby generating a plurality of modulated streams of optical pulses;

combining the plurality of modulated streams of optical pulses into a combined modulated stream of optical pulses;

transmitting the combined modulated stream of optical pulses; and remotely receiving the transmitted combined modulated stream of optical pulses.

21. The method of claim 20, wherein the array of sensors is an array of acoustic sensors.

22. The method of claim 20, wherein a duty cycle of the plurality of streams of optical pulses is about 1/(2N), where N represents the number of optical modulators.

23. The method of claim 20, wherein the combined modulated stream of optical pulses is in a time division multiplexed format.

24. The method of claim 20, wherein the combined modulated stream of optical pulses is in a time division multiplexed format and a wavelength division multiplexed format.

25. The method of claim 20, wherein each of the received streams of optical pulses is modulated by passing and blocking optical pulses in the received streams.

* * * * *